Figure 1:
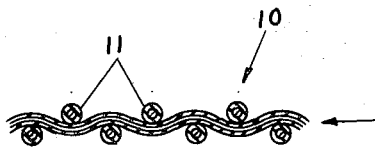

Sept. 30, 1958   T. J. MOTTER ET AL   2,854,355

TREATMENT OF GLASS FIBERS

Filed Nov. 12, 1953

Glass Cloth Having a Silane Coating on the Strands Thereof, Formed By Slowly Drying Thereon an Aqueous Solution of a Silanol Having a pH of 4.5 to 7.5.

INVENTORS
Theodore J. Motter and
BY William L. Elton

Nobbe & Swope
ATTORNEYS

United States Patent Office 2,854,355
Patented Sept. 30, 1958

2,854,355

TREATMENT OF GLASS FIBERS

Theodore J. Motter, Lemoyne, and William L. Elton, Maumee, Ohio, assignors, by mesne assignments, to L-O-F Glass Fibers Company, Toledo, Ohio, a corporation of Ohio Application November 12, 1953, Serial No. 391,760

9 Claims. (Cl. 117—103)

The present invention relates broadly to the treatment of glass fibers, and is more particularly concerned with a new and improved method of substantially increasing the softness of treated fibers.

For the past several years there has been manifested in the plastics industry considerable interest in laminates formed of fibrous glass fabrics and unsaturated polyester resins. Such laminates are characterized by high strength, low weight, and dimensional stability, and in addition, have excellent resistance to water, corrosion and weather.

Due, however, to the fact that bare glass does not adhere well to polyesters, especially in the presence of moisture, it is necessary that a finishing agent be used which is or contains a coupling agent capable of bonding to the fibrous glass surface and to the plastic matrix. And among the classes of finishing agents which have been most frequently used are the organosilicon and organochromium materials.

Some of the organosilicon compounds which have been or are presently being used as finishing agents are diallyldiethoxysilane, vinyl trichlorosilane, the soluble salts of the vinyl and allylsiloxanols, and vinyl triethoxysilane. The present invention is of important application to each of these materials, however, for the purpose of illustrating the new and improved results achieved thereby, specific reference will be made herein to vinyl triethoxysilane as the preferred finishing agent.

In the application of Robert Steinman, Serial No. 265,363, filed January 7, 1952, now patent 2,688,006, issued August 31, 1954, and which is assigned to the assignee of the present application, there is disclosed a method for improving the receptivity of glass fiber surfaces for resinous materials which comprises the steps of contacting the glass fibers with an aqueous solution of a hydrolyzed vinyl alkoxy silane, and drying said silane on the glass fiber surfaces. In accordance with the disclosure of said application, a water solution is prepared by dissolving or hydrolyzing one of the noted silanes, preferably vinyl triethoxysilane, at concentrations up to thirty parts by weight of the silane in one hundred parts by weight of water to which an acidifying agent has been added. The initially immiscible mixture of silane and water is then vigorously stirred until a clear homogeneous solution is obtained. Thereafter, the silane solution is diluted with water to approximately 1.25 percent silane, applied to the pre-cleaned glass fibers by suitable methods, and then dried thereon.

As is further brought out in said Steinman application, laminates fabricated with polyester resins from glass cloth thus treated have flexural strengths and other properties substantially superior to heretofore produced laminates of a similar character.

Prior hereto, and in accordance with the Steinman teachings, it has been considered critical that the pH of the diluted silane solution be maintained within the range of 3 to 4, and most desirably between 3.5 and 4. The explanation for this is that solutions having a pH in excess of the noted range are of limited stability, and precipitate rather readily. Accordingly, accurate controls were maintained on the pH of the finishing solution during the application procedure, and when necessary, additions of an acid, as for example 90% formic, were made with stirring.

In order to produce acceptable results in the production of plastic laminates, it has also been considered of importance that the fabrics subsequent to treatment with the finishing solution be subjected to a drying operation characterized by exposure of both faces of the fabric to a relatively high temperature for a relatively short period of time. Such a procedure has been almost universally accepted in the art, prior to the present invention, and has resulted in finished glass cloth which was entirely acceptable for many applications.

However, it has been found that glass cloth as thus treated leaves something to be desired by way of softness when utilized in the reinforcement of laminates having curved or contoured surfaces, or certain other different shapes. To explain, fabrics which have been finished in accordance with heretofore accepted procedures possess a degree of stiffness which renders it somewhat difficult to shape them into conformity with the curved mold surface, and while the flexural, tensile and compression tests on the laminates have been quite satisfactory, the problems encountered in properly shaping the relatively stiff finished cloth have indeed been serious ones.

It is therefore an important aim of the present invention to provide a method of treating fibrous glass materials with an organosilicon finishing agent, which method results in a treated product having a new and improved degree of softness.

Another object of the invention lies in the provision of a fibrous glass product characterized by substantially increased softness, and which when employed in a plastic body, results in the production of a laminate having improved translucency.

Still another object of the invention is to provide a method of treating glass fabric, which includes the steps of contacting said fabric with an aqueous solution of a hydrolyzed vinyl alkoxy silane having an acid pH, and drying the finished fabric at a relatively low temperature for a relatively long period of time while maintaining a substantially quiescent atmosphere within the fabric.

Other objects and advantages of the invention will become more apparent during the course of the following description when taken in connection with the accompanying drawings.

Figure 2:
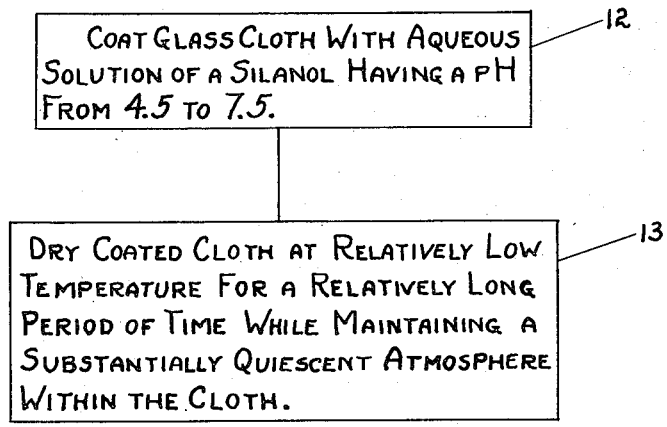

In the drawings wherein like numerals are employed to designate like parts throughout the same:

Fig. 1 is an enlarged diagrammatic cross-sectional view of woven glass cloth having a silane coating thereon produced in accordance with the present invention; and Fig. 2 is a flow diagram illustrating the method of coating woven glass cloth in accordance with the method of the present invention.

In accordance with the present invention, the finishing solution may be prepared as follows. Water is acidulated with 90% formic acid until its pH is adjusted to 3.6. An operable range of pH is 3.2 to 4.6; 3.6 being recommended. Normally this end is achieved by adding approximately 10 cc. of 90% formic acid to 100 gallons of water. The quantity of formic acid employed may vary slightly due to the variation in the pH of the water, which may range from a pH of 4.5 to 7.0.

To 9.0 gallons of water, the pH of which has been adjusted to 3.6 with formic acid, is added 1.0 gallon of vinyl triethoxysilane. Although certain of the other silanes earlier noted may at times be used, vinyl triethoxysilane is preferred because of the active nature of the vinyl group, which has been found to be particularly effective in improving the adhesion of resins or plastics to the surfaces of glass fibers.

In the preparation of the finishing solution it will be observed that the vinyl triethoxysilane floats as a layer upon the surface of the water. This is accounted for by the fact that the specific gravity of vinyl triethoxysilane is less than that of water and is only slightly miscible therewith. At this point the mixture is vigorously stirred to bring about good mixing of the water and the vinyltriethoxysilane. During the stirring procedure hydrolysis of the vinyl triethoxysilane proceeds, and when hydrolysis is completed, the layer of vinyl triethoxysilane disappears and there is provided a clear and homogeneous stock solution. At such time the pH of the solution will be found to be around 3.5, and said stock solution is then diluted with water in the proportion of one part of stock solution to nine parts of water by volume, yielding the final finishing solution to be applied to the glass fabric. A pH check on the solution in its diluted condition will normally produce a figure between 4.5 and 5.5.

The solution is then transferred to a suitable dip tank and the glass cloth caused to pass therethrough by conventional techniques as shown by step 12 of the flow diagram of Fig. 2 of the drawings. As the cloth progresses through the solution the pH thereof progressively rises to as high as 7.5, and with the increase in pH, the condition of the solution changes from clear to hazy to cloudy. The rise in pH value is believed explainable by a leaching out effect, that is, alkaline constituents in the glass as well as a certain amount of binder residue which was not completely removed in the cleaning operation are removed from the cloth as it passes through the dipping solution.

Although satisfactory results are obtained when the pH of the finishing solution slightly exceeds 7, the preferred range is between 5.5 and 6.5 and more desirably approximately the latter figure. Above a pH of 6.5 the solution tends to become definitely unstable, and to avoid this condition, freshly made solution is added to the dip tank at substantially the same rate as it is removed therefrom by the fabric, or if desired, small additions of 90% formic acid may be made to the dip tank. Preferably, only that amount of acid is added to the tank as will produce a pH of not less than 5.0, and more suitably between 5.0 and 6.5.

Prior to the present invention it was considered necessary to very accurately control the pH of the solution in the dip tank and maintain it within the range of 3.6 to 4.6. This was done by checking the pH at regular intervals, as for example, after 250 yards of fiber glass fabric had been passed through the dipping tank. However, it has been discovered that this is not necessary, but instead, that equally satisfactory results by way of flexure, tension and compression may be obtained when the pH of the solution is allowed to climb to between 5.5 and 7.5. In fact, as will be noted in more detail later, surprising improvements by way of softness of the finished fabric and improved translucency of the plastic laminate results when the solution has a pH within the relatively high range noted, and more preferably when it is between 5.5 and 6.5.

Subsequent to the application procedure above described, the glass fabric is dried. This may be done by one of several methods, however, according to the present invention, most satisfactory results by way of luster and softness are obtained by drying at a relatively low temperature for a relatively long period of time while maintaining a substantially quiescent atmosphere within the fabric as represented by step 13 of the flow diagram of Fig. 2 of the drawings. This is preferably accomplished by reeling up the wet fabric as it leaves the dip tank, rolling it upon a mandrel, which is preferably perforated, and then drying it in an oven at 250° F. for a period of approximately 18 hours. Although variations in the time and temperature of drying may be practiced, it has been found that a temperature substantially less than 500° F. for at least 12 hours should be used.

A successful and illustrative procedure for drying on mandrels may be described as follows. A length of glass cloth as received from the dip tank was rolled onto a perforated steel mandrel of 12 inch diameter to a thickness of approximately one inch, although of course it may at times be preferred to roll on a greater or lesser amount of cloth. The mandrel as thus loaded was located within an oven for 18 hours at 240° F. During the drying operation the circulation of air within the oven was at a minimum, being of that amount necessary to remove evaporating moisture from said oven. However, by virtue of the rolled condition of the fabric, a substantially quiescent atmosphere was maintained therein.

A cloth 10, treated in accordance with the present invention and having a coating of silane 11 thereon is shown in the enlarged cross sectional view of Fig. 1.

The roll of cloth (known to the art as style 181) was completely dry when removed from the oven, although the first or outermost layer was noted to have a somewhat chalky appearance and the same was generally true with regards to the layer in direct contact with the mandrel. All cloth immediately past the first or outermost layer, and on throughout the roll, however, was very soft and lustrous. Laminates prepared from the fabric as thus dried had a greatly improved translucency. Further, the laminates were tested for flexure, tension and compression and produced results at least comparable to, and in many cases better than, those attained prior to the discovery of the present procedure.

The fabric as thus finished and subsequently dried in the manner above described has been tested for stiffness on the Clark softness-stiffness tester and produced an average result of 2.05 calculated on the basis of the formula $$\text{Stiffness} = \frac{L^3}{100}$$

where L is the length of overhang in centimeters. By way of comparison, heat-cleaned style 181 glass cloth without a finish on it normally shows an average result of about 9.12 on the same tester, while finished fabric treated by the method of the earlier noted Steinman application and dried on cans in a manner well-known to the art generally gives a softness reading of approximately 8.31. As a further comparison, the softest fabric treated with a silane solution having a relatively low pH and tower-dried by customary techniques gave a figure of 18.6. However, more frequently these results run around 49.1.

It may thus be seen that greatly improved results are accomplished by the particular manner of drying herein disclosed, as well as by the use of a silane solution, the pH of which is initially between 4.5 and 5.5 and during the treating operation around 6.5. By way of further indication as to the greater degree of softness attained by drying on a perforated mandrel in the manner earlier noted, different drying procedures have been investigated and the effect upon the softness of the fabric evaluated.

To illustrate, vinyl triethoxysilane was hydrolyzed in a 10% aqueous solution at a pH of 3.5, and this solution was diluted to 1¼% with distilled water causing the pH to rise to 4.8. Two strips of fabric each approximately three feet long were passed through the solution and this resulted in an increase in the pH of the solution to 6.7.

Further, three additional strips of fabric of generally the same length were then passed through the same solution, these strips being designated below as lead, middle and end. The pH of the solution was checked before and after treatment of each strip with the following results:

| Strip | pH at beginning | pH at end | Condition of Solution |
|---|---|---|---|
| Lead | 6.7 | 7.0 | Clear. |
| Middle | 7.0 | 7.3 | Hazy. |
| End | 7.3 | 7.6 | Cloudy. |

The strips as thus treated were then each cut into four pieces and each piece was dried by a different method. The drying methods were as follows:

(1) Air dried by hanging in room.

(2) Dried at 250° F. in a circulating air oven for 10 minutes with all vents closed. This was done to determine what effect, if any, heat would have on method 1.

(3) Dried at 500° F. in a circulating air oven for 5 minutes with all vents closed. This procedure is generally the equivalent of the presently practiced tower drying.

(4) Rolled cloth on a preheated aluminum plate and located same in a platen press. The platens were brought down to a nearly closed position and the cloth therebetween dried for 10 minutes at 250° F. The purpose of this method was to substantially duplicate drying by cans, in the manner well-known to the art.

Each of the four pieces from each strip were then cut into four relatively smaller strips parallel to the warp, and the stiffness of these smaller strips was then determined on the Clark softness-stiffness tester with the following results:

*Stiffness measurements*

| | Air Dry at Room Temp. | 250° F. for 10 Min. in Oven | 500° F. for 5 Min. in Oven | 250° F. for 10 Min. in Platen Press |
|---|---|---|---|---|
| Lead Strip (pH 6.7–7.0) | 10.9 | 11.6 | 18.2 | 5.51 |
| Middle Strip (pH 7.0–7.3) | 7.05 | 10.6 | 17.3 | 5.72 |
| End Strip (pH 7.3–7.6) | 7.79 | 12.3 | 16.0 | 5.72 |

As earlier noted, glass cloth of the same 181 style as above employed when treated with the described silane solution and dried in rolled condition on a perforated mandrel at 240° F. for 18 hours gave a softness result of 2.05. It is thus apparent that the present invention has provided a novel manner of producing an unusually soft and lustrous finished glass cloth, and that as a result thereof, plastic laminates of complicated shapes having improved translucency may be prepared without the prior difficulty encountered in conforming the relatively stiff fabric to said shapes.

It is not presently known with absolute certainty as to exactly what occurs when a silane solution having a relatively high pH is employed and the finished fabric dried on a perforated mandrel or other suitable means in the manner indicated. It is thought to be, however, a combination of these two factors. One explanation concerns the stability of the solution in that formerly, when a very stable solution was used, drying of said solution permitted the active ingredient to stay in solution until a rather late stage and enabled the active ingredient to form a crust over the surface of the fabric as the solution migrated to the surface during the drying operation. A second explanation is associated with the length of drying, mandrel drying being relatively longer. As a result, it is felt that there is less migration and thus less crusting on the fabric. Third, the new and improved results may be explained chemically. The longer drying time, possibly in association with the relatively high pH and substantial absence of circulation of air within the fabric, may have an influence on the manner in which condensation of the molecule takes place on the glass filaments. It is possible that these factors bear on the point at which the condensation is stopped.

Regardless, however, of the exact reason why improved softness results by the present method, it is apparent from the disclosure that novel results do flow from the use of a silane solution having a pH of more than 4.5 and less than 7.5, and also by drying the fabric treated with such a solution at a relatively low temperature for a relatively long period of time while maintaining a substantially quiescent atmosphere within the fabric itself. To explain, the presence of a high air flow within the commonly known textile drying ovens or towers is believed to be a factor contributing to crustation. However, by the use of means such as a perforated mandrel, which may be of any suitable diameter depending upon the amount of fabric to be dried, an excessive amount of air does not circulate through the cloth. Rather, air passes within the drying oven only in an amount sufficient to drive off moisture evaporated from the fabric, and by virtue of the rolled condition of the fabric, it is relatively impossible for an active circulation of air to occur within the fabric itself.

It is to be understood that various modifications may be made in the compositions and procedures herein disclosed without departing from the spirit and scope of the invention as defined in the appended claims.

We claim:

1. A method of treating glass fibers to improve the receptivity of said fibers for resinous materials, which comprises contacting the fibers with an aqueous solution of a hydrolyzed vinyl silane having an acid pH, arranging said contacted glass fibers one upon the other into a plurality of fibrous layers, and drying the solution on the fibers while they are thus arranged.

2. A method of treating glass fibers as defined in claim 1, in which the pH of the aqueous solution is generally between 4.5 and 7.5.

3. A method of treating glass fabric to improve the receptivity of said fabric for resinous materials, which comprises passing the fabric into and through a bath containing an aqueous solution of a hydrolyzed vinyl silane having an acid pH, rolling a plurality of layers of the treated fabric onto a drying member, and drying the solution on the fabric while said fabric is in rolled condiiton and maintained free from circulating air currents.

4. A method of treating glass fabric as defined in claim 3, which includes the step of controlling the pH of the aqueous solution so as to be within the range of 4.5 and 7.5.

5. The method of treating glass fibers to improve the receptivity thereof for resinous materials, comprising contacting the fibers with an aqueous solution of a hydrolyzed alkenyl polyalkoxy silane having a pH in the range from 4.5 to 7.5, arranging said contacted fibers upon each other as a plurality of layers, and drying the solution on the fibers while they are thus arranged.

6. The method of treating glass fibers as defined in claim 5 wherein the fibers are dried at a temperature of 200 to 250° F. for a period of 12 to 20 hours.

7. The method of treating glass fibers as defined in claim 5 in which an aqueous solution of a hydrolyzed alkenyl trihalo silane is employed.

8. The method of treating glass fibers as defined in claim 6 in which an aqueous solution of a hydrolyzed alkenyl trihalo silane is employed.

9. Glass fibers having a resinous coating thereon produced by the process of claim 1.

References Cited in the file of this patent

UNITED STATES PATENTS

| | | |
|---|---|---|
| 2,493,381 | Balassa | Jan. 3, 1950 |
| 2,563,288 | Steinman | Aug. 7, 1951 |
| 2,649,396 | Witt | Aug. 18, 1953 |
| 2,688,007 | Steinman | Aug. 31, 1954 |
| 2,689,806 | Dalton | Sept. 21, 1954 |
| 2,790,736 | McLaughlin et al. | Apr. 30, 1957 |